US011334538B2

(12) United States Patent
Lopes et al.

(10) Patent No.: US 11,334,538 B2
(45) Date of Patent: May 17, 2022

(54) SYSTEM AND METHOD FOR CARDINALITY ESTIMATION FEEDBACK LOOPS IN QUERY PROCESSING

(71) Applicant: Microsoft Technology Licensing, LLC, Redmond, WA (US)

(72) Inventors: Pedro M. Lopes, Duval, WA (US); Vasileios Papadimos, Seattle, WA (US); Joel L. Redman, Jr., Seattle, WA (US); Gjorgji Gjeorgjievski, Kirkland, WA (US); Joseph I. Sack, Minneapolis, MN (US); In-Jerng Choe, Sammamish, WA (US); Ankit Mahajan, Sammamish, WA (US); Nan Xing, Bellevue, WA (US); Alexey Eksarevskiy, Redmond, WA (US); Chandrashekhar Kadiam, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 145 days.

(21) Appl. No.: 16/428,199

(22) Filed: May 31, 2019

(65) Prior Publication Data

US 2020/0379963 A1 Dec. 3, 2020

(51) Int. Cl.
*G06F 16/00* (2019.01)
*G06F 16/21* (2019.01)
(Continued)

(52) U.S. Cl.
CPC ........ *G06F 16/217* (2019.01); *G06F 11/3419* (2013.01); *G06F 16/2425* (2019.01); *G06F 16/24542* (2019.01); *G06F 16/24549* (2019.01)

(58) Field of Classification Search
CPC ............... G06F 16/217; G06F 16/2425; G06F 16/24542; G06F 16/24549; G06F 11/3419
See application file for complete search history.

(56) References Cited

U.S. PATENT DOCUMENTS

| 8,818,988 B1* | 8/2014 | Brown .................. G06F 16/217 |
| | | 707/713 |
| 2002/0198867 A1 | 12/2002 | Lohman et al. |

(Continued)

OTHER PUBLICATIONS

"International Search Report and Written Opinion Issued in PCT Application No. PCT/US20/028889", dated Jul. 2, 2020, 11 Pages.

(Continued)

*Primary Examiner* — Augustine K. Obisesan
(74) *Attorney, Agent, or Firm* — Fiala & Weaver P.L.L.C.

(57) ABSTRACT

Methods for cardinality estimation feedback loops in query processing are performed by systems and devices. A query host executes queries against data sources via an engine based on estimated cardinalities, and query monitors generate event signals during and at completion of execution. Event signals include indicia of actual data cardinality, runtime statistics, and query parameters in query plans, and are routed to analyzers of a feedback optimizer where event signal information is analyzed. The feedback optimizer utilizes analysis results to generate change recommendations as feedback for later executions of the queries, or similar queries, performed by a query optimizer of the query host. The query host stores change recommendations, and subsequent queries are monitored for the same or similar queries to which change recommendations are applied to query plans for execution and observance by the query monitors. Change recommendations are optionally viewed and selected via a user interface.

20 Claims, 6 Drawing Sheets

(51) Int. Cl.
*G06F 16/242* (2019.01)
*G06F 16/2453* (2019.01)
*G06F 11/34* (2006.01)

(56) References Cited

U.S. PATENT DOCUMENTS

| | | | |
|---|---|---|---|
| 2003/0182276 A1* | 9/2003 | Bossman | G06F 16/217 |
| 2004/0236722 A1 | 11/2004 | Waas et al. | |
| 2005/0097078 A1* | 5/2005 | Lohman | G06F 16/90335 |
| 2006/0195416 A1* | 8/2006 | Ewen | G06F 16/2471 |
| 2007/0136383 A1* | 6/2007 | Steinbach | G06F 16/217 |
| 2007/0226178 A1* | 9/2007 | Ewen | G06F 16/2453 |
| 2007/0276825 A1* | 11/2007 | Dettinger | G06F 16/2425 |
| 2008/0133454 A1 | 6/2008 | Markl et al. | |
| 2008/0222092 A1* | 9/2008 | Hueske | G06F 16/24542 |
| 2009/0077016 A1* | 3/2009 | Belknap | G06F 16/24542 |
| 2009/0094191 A1 | 4/2009 | Chaudhuri et al. | |
| 2010/0235349 A1* | 9/2010 | Kuno | G06F 16/217 707/718 |
| 2014/0095472 A1 | 4/2014 | Lee et al. | |
| 2014/0181078 A1* | 6/2014 | Ghazal | G06F 16/24542 707/718 |

OTHER PUBLICATIONS

"Oracle Autonomous Database: The Industry's First Self-Driving Database", In White Paper of Oracle, Sep. 2018, 13 Pages.

\* cited by examiner

SYSTEM AND METHOD FOR CARDINALITY ESTIMATION FEEDBACK LOOPS IN QUERY PROCESSING

BACKGROUND

Many modern relational database engines rely on cost-based query optimizations, where efficiency of query plan chosen depends on accuracy of cardinality estimation. Cardinality estimation may be based on statistics related to data distribution and different models related to the query shape. Models currently exist to estimate cardinality for a specific type of query operator and depending on assumptions such as data correlation or containment, those models may render significantly different results. Additionally, application workloads can be susceptible to changes to internal query processing cardinality estimation models which may result in sudden performance drops due to the execution plan being used differing from previously known good execution plans. When these sudden performance issues occur, workload degradation can affect the number of queries able to be executed against a database due to factors such as memory/processor starvation or misallocation and significantly increased runtimes.

Internal query processing model changes are code enhancements and optimizations that, due to the complexity of query optimizers and the infinitely different types of workload profiles running on a relational database, may yield results that decrease execution performance as compared to a previously known good execution plan.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for cardinality estimation feedback loops in query processing against databases, such as relational databases, are performed by systems and devices. A query host executes queries against data sources via an engine based on estimated cardinalities, and query monitors are utilized for generation of event signals during execution. Event signals include indicia of actual data cardinality, runtime statistics, and query parameters in query plans, and are routed to analyzers of a feedback optimizer where information in the event signals from the monitors is analyzed. Information from the analysis is then utilized by the feedback optimizer to generate feedback recommendations for optimizations of later executions of the queries, or of similar queries, performed by a query optimizer of the query host. Upon receipt by the query host, the feedback recommendations are stored, and subsequent queries are monitored for the same or similar queries to which feedback recommendations are applied to query plans for execution and observance by the query monitors. Feedback recommendations are optionally viewed and selected via user interface.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
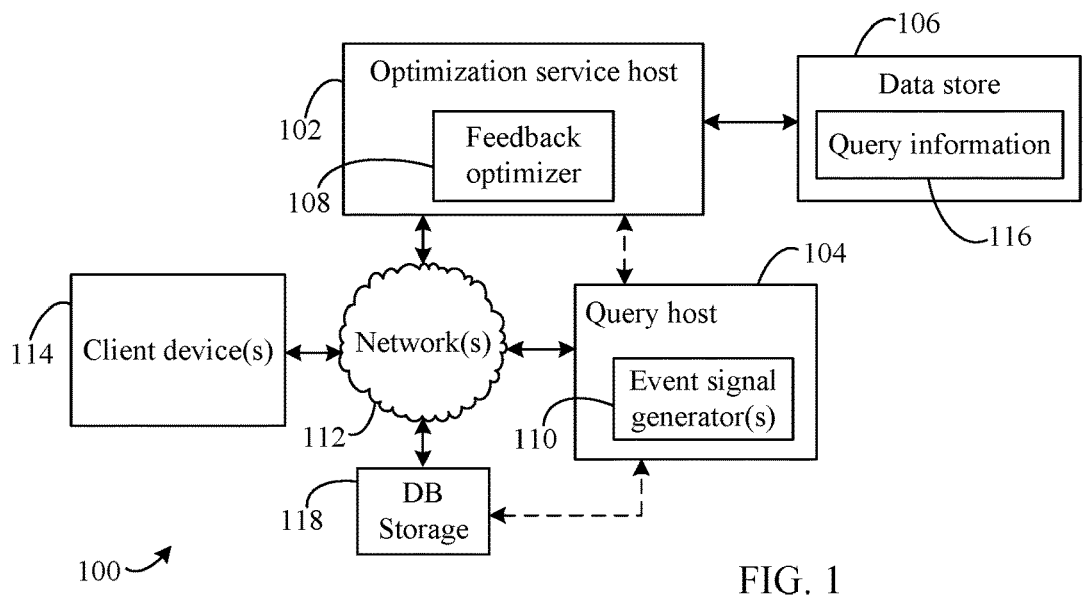
FIG. 1 shows a block diagram of a networked system for cardinality estimation feedback loops in query processing, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for cardinality estimation feedback loops in query processing. Section III below describes example computing device embodiments that may be used to implement features of the embodiments described herein. Section IV below describes additional examples and advantages, and Section V provides some concluding remarks.

II. Example Embodiments for Cardinality Estimation Feedback Loops in Query Processing Methods for cardinality estimation feedback loops in query processing against databases, e.g., relational databases, are performed by systems and devices, according to embodiments herein. Queries may be executed with or based on estimated cardinalities and corresponding query plans, and monitored by the query host executing the queries. Query monitors are utilized for generation of event signals during and at the completion of execution of the queries to capture and/or generate event signals that include indicia of actual data cardinality of the data queried, runtime statistics of the query and/or the query host, and query parameters in query plans used. Event signals are transmitted to a feedback optimizer, which may be hosted separately from the query host, where a signal router routes the event signals to appropriate signal analyzers. Information in the event signals from the monitors is then analyzed, and the analysis results are passed to a feedback manager of the feedback optimizer to generate change recommendation feedback as guidance, or preemptive guidance, for optimizations of later executions of the queries, or of similar queries, performed by a query optimizer of the query host. The feedback optimizer may provide the change recommendations to the query host, where they may be stored.

Subsequent queries received by the query host may be monitored for identification of the same or similar queries to which the change recommendations may be applied, either automatically or as selectable options via a user interface (UI). That is, change recommendations may be applied to subsequently executed query plans so that efficient execution taking actual cardinality into account may be performed. These subsequent queries are then observed by the query monitors during and at the completion of execution, and the feedback loops may repeat to further refine the query plans. A query may be similar semantically, based on semantic equivalency, and/or like, in whole or in part, with respect to another query as described in additional detail herein.

In the embodiments herein, cardinality estimation (CE) feedback improves cardinality estimation itself, e.g., and without limitation, by analyzing the profile data of past query executions and heuristically finding corrections that permit a cardinality estimator to work more optimally for given workloads. This may take the form of additional query hints, the creation of additional statistics, and/or other changes as determined or deemed necessary. The profile data of a query may include estimated and actual cardinality values for each node in a query plan. The selection of a query plan to handle characteristics of a relational database, e.g., data correlation, memory grants, join types, indexing, containment types, an interleaved optimization for a table-valued function (TVF), and/or a deferred compilation of runtime objects such as table variables, effects the efficiency of query execution, which may be directly impacted by CE. By enabling lightweight profiling in a query host, e.g., SQL Server® by way of example and not limitation, profile data can be collected for each query with minimal overhead and effects for executing queries, for analysis in an optimization service.

The task of analyzing the profile data for CE feedback may, by its nature, consume processor and memory resources, thus competing with query execution workloads, and potentially increasing the cost of operation for similar workloads, if performed within the query engine. To avoid such pressure, CE feedback analysis tasks may be performed by the optimization service as a separately hosted service. Thus, embodiments described herein provide an infrastructure that unifies such feedback analyses for query and non-query feedback analysis, through the same, or an equivalent, external optimization service. However, the embodiments herein are not limited to an eternally-hosted optimization service, and feedback loops where signals are generated and handled entirely within the query engine are also contemplated herein via extension of the described embodiments.

When a query is initially submitted for execution against a database, it first goes through the normal query execution cycle. According to embodiments, query profile data is collected with standard profiling data attached. At the end of query execution, the query profile data and/or standard profiling data is submitted to an optimization service for analysis, and potentially feedback. When feedback is determined, the optimization service may provide such feedback, taking CE estimation into account, in the form of query plan/model hints, and/or the like. Alternative feedback mechanisms may include, without limitation, creating new filtered statistics or join hints, updating existing statistics to reflect new data distributions, etc.

Regarding data flow, the query engine/host may be largely unaware that the optimization service is present, by way of the embodiments herein. To this end, the optimization service is configured to analyze signals or event signals (e.g., XEvents messages) from the query optimizer of the query server host and apply feedback in the form of hints for query plans, models, parameters, etc., database settings, new statistics, other database/server artifacts, and/or the like, as described herein.

Communication connections between the optimization service and query server host may be initiated by the optimization service (based on the principle above) and continue as long as both the optimization service and query service host are available for communications. According to embodiments, for communications between the optimization service and the query service host, there may be two persistent connections—the event stream and a connection for recommendations, feedback, hints, etc., that may be, as an example, a standard Tabular Data Stream (TDS) application layer protocol.

Generally, for data persistence of feedback, recommendations, hints, etc., may be stored by the query server host, locally or remotely, for the query engine via configuration changes, query hints (including query parameters, plan and/or model alterations, etc. Such "change recommendations" may also be logged in some form as arriving from the optimization service, so that they may be monitored and rolled back as needed via the query server host. These change recommendations and associated logging may also be persisted in such a way that events such as query server reboots, backup/restore cycles, etc., continue to provide the same recommended behaviors, independent of whether the optimization service is itself connected.

The optimization service may also include an option to store historical information in a local or remote data store, e.g., intermediate storage, for later analysis. The data which can be stored here may be restricted to metadata—that is, embodiments may provide that no user data may be stored, whether in raw form, query plans, statistics, etc., to insure integrity of user data and user privacy. Embodiments also contemplate that this intermediate storage may be unaffected by reset events, etc., unless, e.g., an associated database is migrated to another address.

The optimization service may also be configured to provide a means to migrate intermediate data from one service database to another. For instance, monitored database data may be stored in a separate associated database, and the associated database may be backed-up/restored. Embodiments also provide for the ability to notify the optimization service that a monitored database has migrated to a new location, thus remapping the intermediate data to a new location without a backup/restore cycle.

The embodiments herein for optimization services are applicable to any type of query host/engine, and may be implemented for server- and/or cloud-based query engine instances, and may include implementations of the optimization service(s) for multiple query host/engine instances across on-premises and/or cloud settings where the instances are of different types of query hosts/engine, to be able to learn from and apply feedback to broader workloads. Embodiments also include the ability to leverage other cloud-based services such as machine learning (ML), etc.

Accordingly, cardinality estimation feedback loops in query processing provide for refinement of query execution while minimizing overhead during execution of queries. The described embodiments provide for systems configured to collect, store, analyze, react and recommend over model variations that occur during compilation and execution of queries enabling systems to be reactive and adaptive to specific compile and runtime statistics for improvement of current or subsequent execution of same or similar queries against databases, e.g., relational databases.

These and further embodiments will be described in further detail below, and in the Sections and Subsections that follow.

Systems, devices, and apparatuses may be configured in various ways to perform their functions for cardinality estimation feedback loops in query processing against databases, such as relational databases. For instance, FIG. 1 is a block diagram of a networked system 100, according to embodiments. System 100 is configured to enable cardinality estimation feedback loops in query processing, according to embodiments. As shown in FIG. 1, system 100 includes an optimization service host 102, a client device(s) 114, and a query host 104. In embodiments, optimization service host 102, query host 104, and client device(s) 114 may communicate with each other over a network 112. It should be noted that various numbers of host devices, client devices, and/or ML hosts may be present in various embodiments. Additionally, any combination of the components illustrated in FIG. 1 may be present in system 100, according to embodiments.

As noted above, optimization service host 102, client device(s) 114, and query host 104 are communicatively coupled via network 112. Network 112 may comprise any type of communication links that connect computing devices and servers such as, but not limited to, the Internet, wired or wireless networks and portions thereof, point-to-point connections, local area networks, enterprise networks, and/or the like. In some embodiments, e.g., for legacy recordings, data may also be transferred, in addition to or in lieu of, using a network, on physical storage media, between client device(s) 114, query host 104, and/or optimization service host 102.

Query host 104 may comprise one or more server computers or computing devices, which may include one or more distributed or "cloud-based" servers. In embodiments, query host 104 may be associated with, or may be a part of, a cloud-based service platform such as Microsoft® Azure® from Microsoft Corporation of Redmond, Wash., in some embodiments query host 104 may comprise an on-premises server(s). Various systems/devices such as optimization service host 102 and/or client devices such as client device(s) 114 may be configured to provide data and information, including queries and CE feedback, associated with CE estimation and query execution/processing to query host 104 via network 112. Query host 104 may be configured execute queries provided from client device(s) 114 via network 112, to monitor runtime statistics, determine cardinality of queried data, monitor query parameters, etc., during the execution of queries, and to provide such information to optimization service host 102. As illustrated, query host 104 includes an event signal generator(s) 110 that may be configured to generate the information and/or event signals provided to optimization service host 102 to perform feedback operations described herein. Further details regarding event signal generation and query execution monitoring are provided below.

It should be noted that as described herein, embodiments of query host 104 are applicable to any type of system where queries are received, e.g., over a network, for execution against a database(s) (including data sets). One example noted above is where query host 104 is a "cloud" implementation, application, or service in a network architecture/platform. A cloud platform may include a networked set of computing resources, including servers, routers, etc., that are configurable, shareable, provide data security, and are accessible over a network such as the Internet. Cloud applications/services such as for machine learning may run on these computing resources, often atop operating systems that run on the resources, for entities that access the applications/services over the network. A cloud platform may support multi-tenancy, where cloud platform-based software services multiple tenants, with each tenant including one or more users who share common access to software services of the cloud platform. Furthermore, a cloud platform may support hypervisors implemented as hardware, software, and/or firmware that run virtual machines (emulated computer systems, including operating systems) for tenants. A hypervisor presents a virtual operating platform for tenants.

System 100 also includes a database (DB) storage 118 that stores one or more databases or data sets against which query host 104 executes queries. DB storage 118 may be communicatively coupled to query host 104 via network 112, as shown, may be a portion of query host 104, may be an external storage system of query host 104, or may be a cloud storage system, in different embodiments.

Client device(s) 114 may be any type or combination of computing device or computing system, including a terminal, a personal computer, a laptop computer, a tablet device, a smart phone, a personal digital assistant, a telephone, and/or the like, including internal/external storage devices, that may be utilized to generate and/or provide queries for execution by query host 104. In embodiments, client device(s) 114 may be used by various types of users, such as an administrator, support staff agents, customers, clients, and/or the like to run queries against databases. Client device(s) 114 may include one or more UIs that may be stored and executed thereby, or that may be provided from query host 104. Such UIs are described in further detail herein.

Optimization service host 102 may comprise one or more server computers or computing devices, which may include one or more distributed or "cloud-based" servers, as described above. Optimization service host 102 may include a feedback optimizer 108 that is configured to route event signals to one or more analyzers for feedback determinations (e.g., generation and provision of change recommendations), as described in further detail herein. Optimization service host 102 may be remote to query host 104 or may be a part of query host 104, in embodiments. Optimization service host 102 may also be configured to communicate with query host 104 by connections other than, or in addition to, network 112.

System 100 may include a storage shown as a data store 106 that may be a stand-alone storage system, and/or may be internally or externally associated with optimization service host 102. In embodiments, data store 106 may be communicatively coupled to other systems and/or devices via network 112. That is, data store 106 may be any type of storage device or array of devices, and while shown as being communicatively coupled to optimization service host 102, may be networked storage that is accessible via network 112. Additional instances of data store 106 may be included in addition to, or in lieu of, the embodiment shown. Data store 106 may be an intermediate feedback storage and may be configured to store different types of data/information such as query information 116, including but not limited to, metadata related to queries, query processing/executions data, query plan analyses, and/or the like, as described herein.

Cardinality estimation (CE), as described herein, is a phase within query optimization and compilation which involves the prediction of how many rows of data a tree of query operators is likely to process. CE is used by a query optimizer associated with a query processor/engine to generate an optimal or optimized query execution plan, and when cardinality estimates are accurate, the query optimizer produces an appropriate plan. However, when row estimates are significantly skewed compared to actual row counts, this can result in query performance issues.

The CE feedback embodiments herein learn and apply optimal CE assumptions automatically for both repeatable and singleton queries. Query processors/engines are enabled to choose optimized combinations of adjustments for query plans based on query runtime history. Given that a very small percentage of compiled queries with incorrect estimations of cardinality, and thus incorrectly chosen associated query parameters, may be responsible for a largely disproportionate percentage of processor and system resource usage, the embodiments herein provide for increased system efficiency and appropriate resource usage and allocation.

Host devices such as optimization service host 102 and/or query host 104 may be configured in various ways for or cardinality estimation feedback loops in query processing. For instance, referring now to FIG. 2, a block diagram of a system 200 is shown for or cardinality estimation feedback loops in query processing of databases, e.g., relational databases, according to an example embodiment. System 200 may be an embodiment of system 100 of FIG. 1. System 200 is described as follows.

Figure 2:
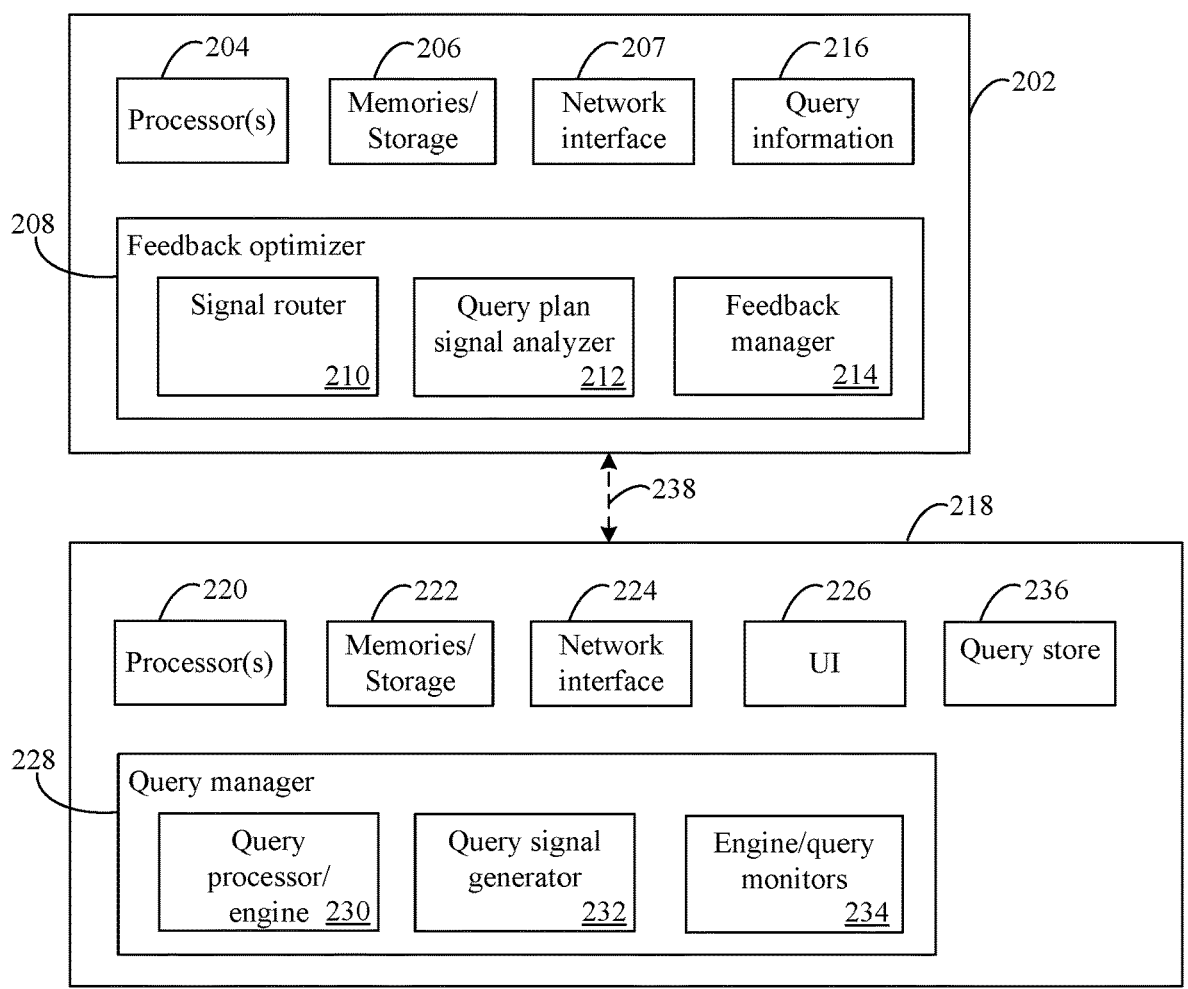
FIG. 2 shows a block diagram of a computing system configured for cardinality estimation feedback loops in query processing, according to an example embodiment.

System 200 includes a computing device 202, which may be an embodiment of optimization service host 102 of FIG. 1, and a computing device 218 which may be an embodiment of query host 104 of FIG. 1, each of which may be any type of server or computing device, including "cloud" implementations, as mentioned elsewhere herein, or as otherwise known. As shown in FIG. 2, computing device 202 and computing device 218 may each respectively include one or more of a processor(s) ("processor") 204 and one or more of a processor(s) ("processor") 220, one or more of a memory and/or other physical storage device ("memory") 206 and one or more of a memory and/or other physical storage device ("memory") 222, as well as one or more network interfaces ("network interface") 207 and one or more network interfaces ("network interface") 224. Computing device 202 may include a feedback optimizer 208 that may be configured to analyze query information and provide change recommendations via feedback, and computing device 218 may include a query manager 228 that may be configured to implement and/or make available change recommendations for query execution, to execute queries, and to monitor/generate query statistics and information for use by feedback optimizer 208.

System 200 may also include additional components (not shown for brevity and illustrative clarity) including, but not limited to, components and subcomponents of other devices and/or systems herein, as well as those described below with respect to FIG. 10, such as an operating system, etc.

Processor 204/processor 220 and memory 206/memory 222 may respectively be any type of processor circuit(s) and memory that is described herein, and/or as would be understood by a person of skill in the relevant art(s) having the benefit of this disclosure. Processor 204/processor 220 and memory 206/memory 222 may each respectively comprise one or more processors or memories, different types of processors or memories (e.g., a cache for query processing), remote processors or memories, and/or distributed processors or memories. Processor 204/processor 220 may be multi-core processors configured to execute more than one processing thread concurrently. Processor 204/processor 220 may comprise circuitry that is configured to execute computer program instructions such as, but not limited to, embodiments of feedback optimizer 208 and/or query manager 218, which may be implemented as computer program instructions for cardinality estimation feedback loops in query processing against databases, etc., as described herein.

Memory 206/memory 222 may include data store 106 of FIG. 1 in embodiments, and may be configured to store such computer program instructions/code, as well as to store other information and data described in this disclosure including, without limitation, query information 216 (which may be an embodiment of query information 116 of FIG. 1) such as queries, query statistics, information on query processing/executions, query plan analyses, metadata, etc., and/or the like. In embodiments, memory 222 may comprise DB storage 118 of FIG. 1, or computing device 202 may otherwise (internally or externally) utilize DB storage 118.

Network interface 207/network interface 224 may be any type or number of wired and/or wireless network adapter, modem, etc., configured to enable system 200, including computing device 202 and computing device 218, to communicate with other devices and/or systems over a network, such as communications between computing device 202 and computing device 218, shown as a connection 238, as well as communications between systems and computing devices with other systems/devices utilized in a network as described herein (e.g., client device(s) 114, and/or data store 106) over a network such as network 112 as described above with respect to FIG. 1.

Computing device 218 of system 200 may also include one or more UIs (UI) 226 and a query store 236. Query store 236 may be a part of memory 222 in embodiments, and is configured to store currently executing queries and previously executed queries, as well as query plans for executing such queries. In embodiments, query store 236 may store one or more CE models use by query processor 230 to estimate cardinality for executions according to query plans. UI 226 is configured to display change recommendations to users, e.g., which may be selectable options, to enable selectable options for rollback of implemented change recommendations, and to enable or disable feedback from being performed.

Feedback optimizer 208 of computing device 202 includes a plurality of components for performing the functions and operations described herein for cardinality estimation feedback loops in query processing. For instance, feedback optimizer 208 may be configured to analyze query information and provide change recommendations via feedback to query manager 228. As illustrated, feedback optimizer 208 includes a signal router 210, a query plan signal analyzer 212, and a feedback manager 214.

Signal router 210 is configured to route signals such as event signals that are received from query manager 228 to an appropriate analyzer of query plan signal analyzer 212. Query plan signal analyzer 212 is configured to analyze runtime statistics and other query information of the event signals and provide analysis results associated with queried-data cardinality to feedback manager 214 which is then configured to determine change recommendations for query parameters based on cardinality of the data and performance of the query execution. In embodiments, change recommendations may be applied to the same query or to similar queries for their subsequent execution. Additionally, change recommendation options determined by feedback manager 214 may be selected for provision via feedback signals based on a probability analysis.

Query manager 228 of computing device 218 includes a plurality of components for performing the functions and operations described herein for cardinality estimation feedback loops in query processing. For example, query manager 228 may be configured to implement and/or make available change recommendations for query execution, to execute queries, and to monitor/generate query statistics and information for use by feedback optimizer 208. Query manager 228 includes a query processor 230, a query signal generator 232, and one or more engine/query monitors (monitors) 234. In some implementations, monitors 234 may comprise a portion of query signal generator 232, or vice versa.

In embodiments, a portion of query manager 228 may be executing at, or communicating with, client device(s) 114 such that entry of queries can be monitored by monitors 234 and change recommendations may be provided to users via UI 226 prior to query execution initialization.

Query processor 230 is configured to execute queries against databases according to query plans and estimated data cardinality, and may be software and/or hardware utilized in conjunction with processor 220. Query signal generator 232 is configured to generate event signals with runtime statistics for executing queries. The event signals are provided to an optimization host, e.g., computing device 202 comprising feedback optimizer 208, as noted above.

Monitors 234 may comprise one or more monitors for databases, query engines, query execution, and/or received change recommendations. Ones of monitors 234 for databases, query engines, and query execution may monitor runtime performance and operations when queries are executed in order to provide information to query signal generator 232. Monitors 234 may also include a monitor to observe incoming queries to computing device 218 and query manager 228 to determine if a prior executed query for which a change recommendation was generated or other queries similar to the prior executed query are received. In such cases, the same change recommendation may be applied for execution and/or displayed to a user. Query store 236, described above, may also be configured to store received change recommendations.

While shown separately for illustrative clarity, in embodiments, one or more of the components of feedback optimizer 208 and/or query manager 228 may be combined together and/or as a part of other components of system 200. In some embodiments, less than all of the components of feedback optimizer 208 and/or query manager 228 illustrated in FIG. 2 may be included. In software implementations, one or more components of feedback optimizer 208 and/or query manager 228 may be stored in memory 206 and/or memory 222, respectively, and may be executed by processor 204 and/or 220, respectively.

Figure 3:
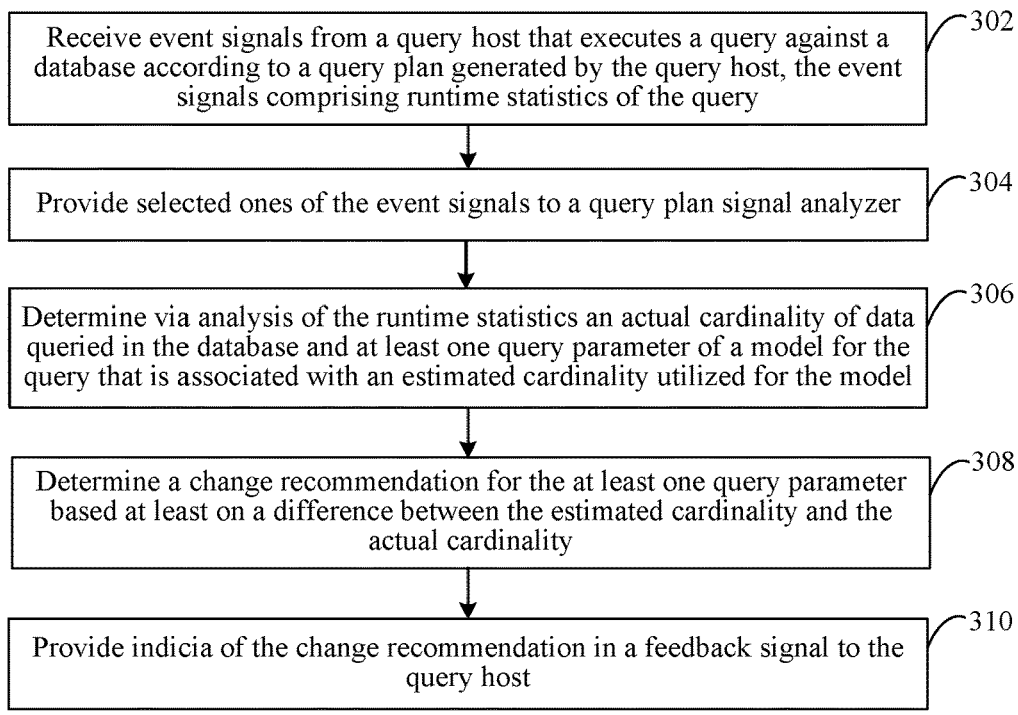
FIG. 3 shows a flowchart for cardinality estimation feedback loops in query processing, in accordance with an example embodiment.
Figure 4:
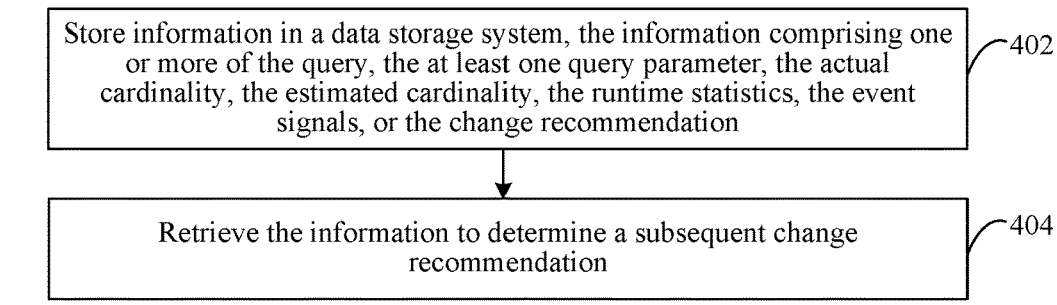
FIG. 4 shows a flowchart for cardinality estimation feedback loops in query processing, in accordance with an example embodiment.

As noted above for FIGS. 1 and 2, embodiments herein provide for cardinality estimation feedback loops in query processing. System 100 of FIG. 1 and system 200 of FIG. 2 may each be configured to perform such functions and operations. For instance, FIGS. 3 and 4 will now be described. FIG. 3 shows a flowchart 300 and FIG. 4 shows a flowchart 400, each being for cardinality estimation feedback loops in query processing, according to example embodiments. Feedback optimizer 208 of computing device 202 in FIG. 2 may operate according to flowchart 300 and/or flowchart 400 in embodiments. Further structural and operational examples will be apparent to persons skilled in the relevant art(s) based on the following descriptions. Flowchart 300 and flowchart 400 are described as follows with respect to system 100 of FIG. 1 and system 200 of FIG. 2.

Flowchart 300 begins at step 302. In step 302, event signals are received from a query host that executes a query against a database according to a query plan generated by the query host, the event signals comprising runtime statistics of the query. For example, signal router 210 of feedback optimizer 208 may be configured to receive the event signals from query signal generator 232 of query manager 228 in a query host, e.g., computing device 218. The event signals may be generated based on execution of a query by query manager 228 against a database of DB storage 118 according to a query plan and a cardinality estimation of the queried data determined thereby. The event signals may include runtime statistics for the query being executed at the query host, and may be generated/provided as XEvent signals/messages.

In step 304, selected ones of the event signals are provided to a query plan signal analyzer. For example, signal router 210 may be configured to provide the received event signals to an appropriate analyzer of feedback optimizer 208, such as query plan signal analyzer 212, to analyze information in the event signals. Signal router 210 may be configured to determine appropriate analyzers for event signal routing based on information included in the event signals, including but not limited to, identifiers of analyzers, monitors, and/or signal generators, etc. In embodiments, event signals may also include queries, query parameters, actual cardinality of queried data, estimated cardinality used by query plans, etc., or indicia thereof, in addition to runtime statistics.

In step 306, an actual cardinality of data queried in the database and at least one query parameter of a model for the query that is associated with an estimated cardinality utilized for the model are determined via analysis of the runtime statistics. For instance, query plan signal analyzer 212 may be configured to determine the actual cardinality of the data queried and query parameters of a query plan or model. That is, query plan signal analyzer 212 may analyze the runtime statistics provided in an event signal(s) described in step 302 and step 304. Query parameters may be based on query plans/models and may include, but are not limited to, data correlation, memory grants, join types, indexing, containment types, interleaved optimizations for a table-valued function, a deferred compilation of runtime objects such as table variables, etc., and may be determined based on information associated with the runtime statistics, according to embodiments. The actual cardinality of the data may be provided in event signals, in addition to other information described in step 304, or may be determined based on the runtime statistics including indicia of unique data accesses and/or the like.

In step 308, a change recommendation for the at least one query parameter is determined based at least on a difference between the estimated cardinality and the actual cardinality. For example, feedback manager 214 may be configured to generate change recommendations for query parameters. In embodiments, a difference between the estimated cardinality for a query plan and the actual cardinality of the queried data determines which changes to query parameters, and the degree of such changes, should be recommended to optimize query processor 230 (i.e., a query engine). As an example scenario, an independent correlation determination of data columns in a table of a queried database with a relatively high cardinality, when a lower cardinality was estimated and partial correlation was assumed, may cause feedback manager to recommend a change to a query predicate utilized in the query plan. Feedback manager 214 may also be configured to generate change recommendations based at least on other information provided in event signals, as described above.

In step 310, indicia of the change recommendation are provided in a feedback signal to the query host. For instance, feedback manager 214 may be configured to provide the change recommendation from step 308, via network interface 207, to query manager 228 of computing device 218 (as a query host), e.g., via TDS signaling. It is contemplated that in embodiments feedback may include zero or more change recommendations for a given query analysis and optimization determination.

Embodiments herein also provide for maintaining and/or processing ML (machine learning) models and training data for models which may be used to perform the techniques described herein.

Referring also now to FIG. 4, flowchart 400 begins at step 402.

In step 402, information is stored in a data storage system, the information comprising one or more of the query, the at least one query parameter, the actual cardinality, the estimated cardinality, the runtime statistics, the event signals, or the change recommendation. For instance, as noted above, feedback manager 214 may be configured receive information in event signals and to store such data as query information 116 in an intermediate storage, e.g., data store 106, for later use in determining change recommendations. Similarly, query plan signal analyzer 212 may be configured to store any type of information received from event signals, in addition to analysis results, as query information 116 in the intermediate storage. Stored data may be limited to metadata in some embodiments (e.g., table, column, and statistic names, but excluding user data in raw form, query plans, or actual statistics). Step 402 may be performed concurrently with, partially-concurrently with, or subsequently to any of step 306, step 308, and/or step 310 of flowchart 300 described above.

In step 404, the information is retrieved to determine a subsequent change recommendation. For example, the information stored in step 402 may be later retrieved by feedback manager 214 to make determinations for change recommendations (e.g., in a subsequent performance of step 308) or for alternative analyses of query processing.

Figure 5:
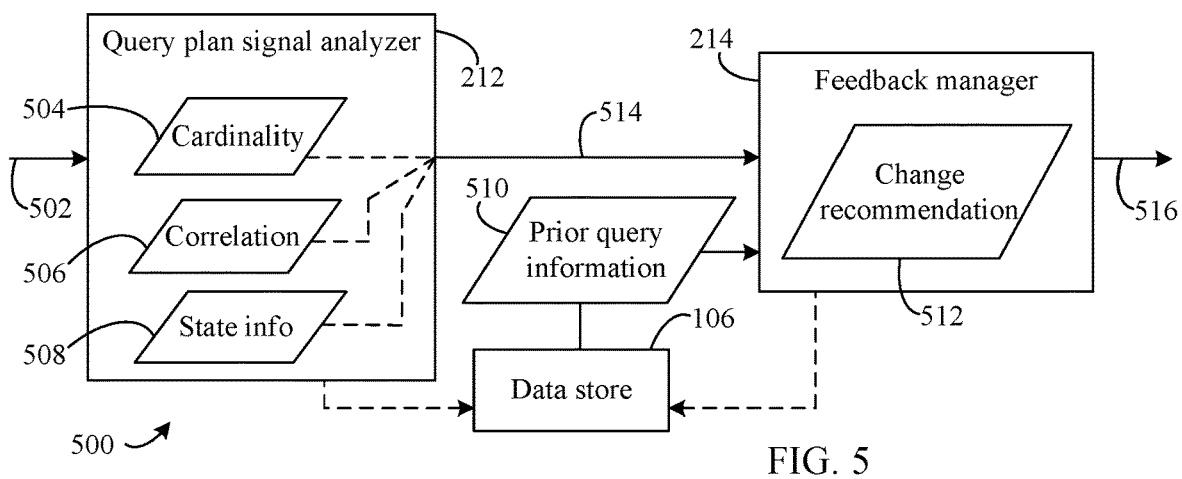
FIG. 5 shows a block diagram of a system for cardinality estimation feedback loops in query processing, in accordance with an example embodiment.

Referring now to FIG. 5, a block diagram of a system 500 is shown for cardinality estimation feedback loops in query processing, according to an example embodiment. System 500 is described in view of system 100 of FIG. 1, system 200 of FIG. 2, flowchart 300, and flowchart 400. System 500 is illustrated with respect to query plan signal analyzer 212 and feedback manager 214, and may be an embodiment of system 200.

As similarly described above in flowchart 300, an event signal 502 is received by query plan signal analyzer 212 from query manager 228 and/or query signal generator 232. Query plan signal analyzer 212 analyzes runtime statistics from event signal 502, and other information therein according to embodiments, to determine analysis result information. The analysis result may include, without limitation, cardinality information 504, correlation information 506, and/or state information 508.

Cardinality information 504 may include actual cardinality, estimated cardinality for the query plan, a difference between estimated and actual cardinality etc. Correlation information 506 may include an indication of correlation for columns of data queried in a database, including but not limited to, independent (i.e., no or little) correlation, partial correlation, or full correlation. State information 508 may include state information of a query statement before and after a change to a query parameter based on a change recommendation, state information for temporary disabling of feedback signals due to oscillation of cardinality estimations, and/or the like.

While not shown for brevity and illustrative clarity, additional information provided with, or determined from, event signal 502 may include the query, the query plan, a memory grant, a join type, an indexing setting, enablement or disablement of a join type, a forced join order, a forced cardinality estimation, a correlation type, a containment type, an interleaved optimization for a table-valued function, a deferred compilation of runtime objects such as table variables, etc. In embodiments, query plan signal analyzer 212 may store some or all of the data and information described above, including analysis results, in data store 106.

Analysis results such as cardinality information 504, correlation information 506, state information 508, and/or the like may be provided by query plan signal analyzer 212 via a signal 512 to feedback manager 214. Additionally, feedback manager 214 may receive prior query information 510 from data store 106, in embodiments. Feedback manager 214 is configured to generate one or more change recommendations, such as a change recommendation 512, based on the received analysis results and/or prior query information 510. Change recommendation 512 is then provided to a query host, e.g., computing device 218 and query manager 228, via a feedback signal 516.

Figure 6:
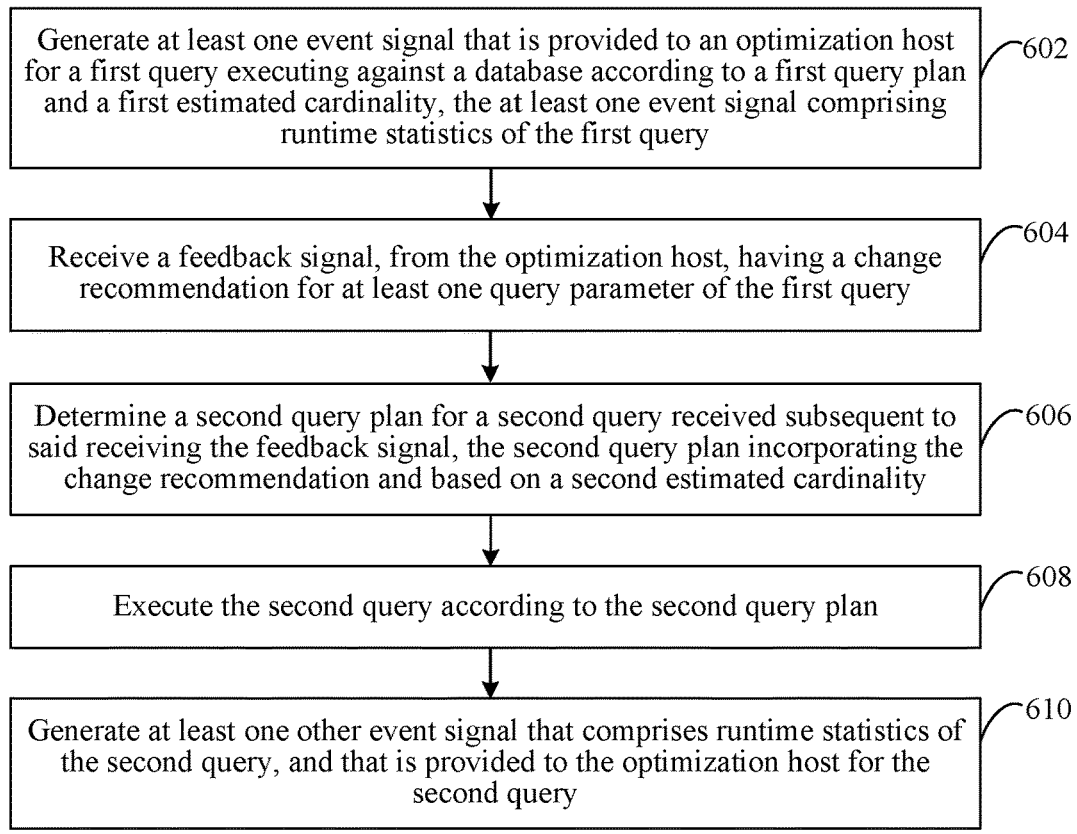
FIG. 6 shows a flowchart for cardinality estimation feedback loops in query processing, in accordance with an example embodiment.

Turning now to FIG. 6, a flowchart 600 for cardinality estimation feedback loops in query processing is shown, according to an example embodiment. System 100 of FIG. 1 and system 200 of FIG. 2 may each be configured to perform functions and operations according to flowchart 600. Query manager 228 of computing device 218 (a query host) in FIG. 2 may operate according to flowchart 600 in embodiments. Further structural and operational examples will be apparent to persons skilled in the relevant art(s) based on the following descriptions. In embodiments, flowchart 600 or portions thereof may be performed before and/or after flowchart 300 of FIG. 3. Flowchart 600 is described as follows with respect to system 100 of FIG. 1 and system 200 of FIG. 2. Flowchart 600 begins at step 602.

In step 602, at least one event signal is generated that is provided to an optimization host for a first query executing against a database according to a first query plan and a first estimated cardinality, the at least one event signal comprising runtime statistics of the first query. For example, query signal generator 232 of system 200 may be configured to generate event signals, as described herein. Event signals may be generated based on execution of queries against a database such as DB storage 118 of system 100 by query processor 230. Queries are executed according to query plans and estimations of data cardinality determined by query processor 230. As noted herein, monitors 234 are configured to monitor aspects of query execution from which query signal generator 232 may generate the event signals which may be provided to an optimization host, e.g., computing device 202, and a query feedback optimizer, e.g., feedback optimizer 208.

In embodiments, aspects of query execution may include runtime statistics that may be affected by or related to cardinality estimations, such as but without limitation, actual processor usage and estimated processor usage, actual memory usage and estimated memory usage, actual data cardinality and estimated data cardinality, data correlation, state information, etc. Runtime statistics may also include information from query executions that is related to query parameters of a query plan or model, e.g., a memory grant, a join type, an indexing setting, a containment type, an interleaved optimization for a table-valued function, a deferred compilation of runtime objects such as table variables, and/or the like.

In step 604, a feedback signal is received, from the optimization host, having a change recommendation for at least one query parameter of the first query. For instance, feedback optimizer 208 of an optimization host, e.g., computing device 202, may provide feedback signals having a change recommendation(s), as described above, to query manager 228 of a query host, e.g., computing device 218. Received change recommendations may indicate that no feedback was generated/provided for the executed query of step 602, or may indicate that one or more hints or change recommendations for the executed query are available for consideration and/or implementation. Change recommendations may be associated with one or more query parameters used in the execution of the query.

In step 606, a second query plan is determined for a second query received subsequent to said receiving the feedback signal, the second query plan incorporating the change recommendation and based on a second estimated cardinality. For example, a second query plan that is different from the first query plan of step 602 may be determined by query processor 230. The second query plan includes an alteration or change, with respect to the first query plan, that is based on the change recommendation and on a second estimated cardinality. In embodiments, the change recommendation is associated with a difference between an estimated and an actual cardinality of the first query executed in step 602, and thus the second estimated cardinality may be determined in view of the actual cardinality.

The change recommendation may alter query execution via the second query plan (e.g., a query parameter for executing the second query) such that a CE model previously used is updated or altered. The change recommendation may alter query execution via the second query plan (e.g., a query parameter for executing the second query) based on data correlation such as independent correlation, partial correlation, or full correlation.

In step 608, the second query is executed according to the second query plan. For instance, the second query may be executed using the second query plan from step 606 by query processor 230. Monitors 234 are configured to monitor the execution of the second query similarly as described above for step 602 and elsewhere herein.

In step 610, at least one other event signal is generated that comprises runtime statistics of the second query, and that is provided to the optimization host for the second query. For example, query signal generator 232 is configured to generate an event signal(s) that represent runtime statistics for the execution of the second query, based on system and execution monitoring performed by monitors 234. As in step 602, generated event signals are provided to an optimization host, e.g., computing device 202, and a query feedback optimizer, e.g., feedback optimizer 208.

Thus, with cardinality estimation feedback loops in query processing, optimization for query execution are realized through, e.g., change recommendations based on effects of cardinality estimations, and the feedback loops may iterate and further optimize execution for the same query and similar queries.

Figure 7:
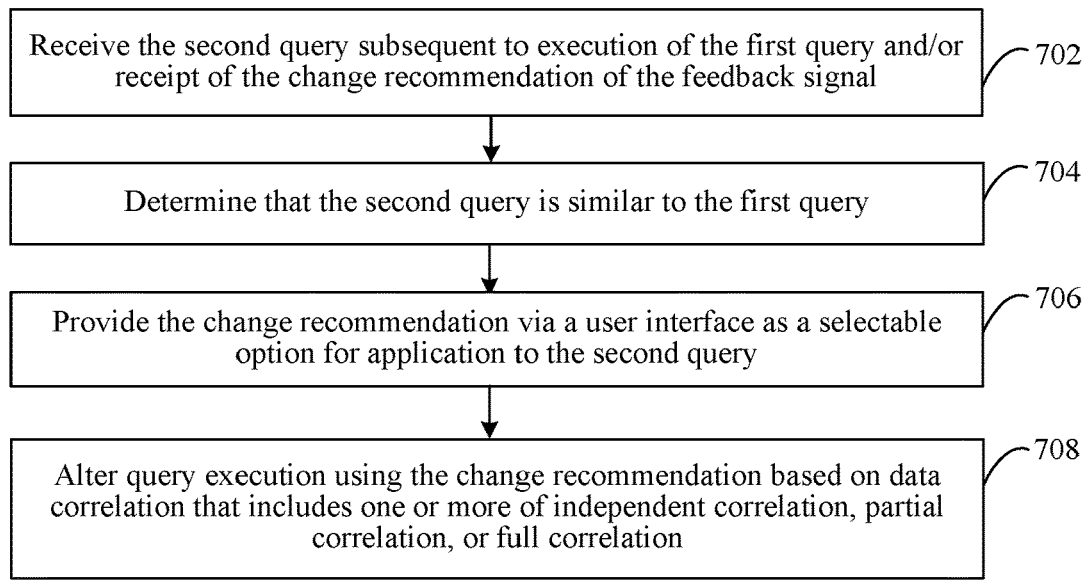
FIG. 7 shows a flowchart for cardinality estimation feedback loops in query processing, according to an example embodiment.

FIG. 7 shows a flowchart 700 for cardinality estimation feedback loops in query processing, in accordance with an example embodiment. Flowchart 700 may be an embodiment of flowchart 600 of FIG. 6. Further structural and operational examples will be apparent to persons skilled in the relevant art(s) based on the following descriptions.

Flowchart 700 is described as follows with respect to system 100 of FIG. 1 and system 200 of FIG. 2. Flowchart 700 begins with step 702.

In step 702, the second query is received subsequent to execution of the first query and/or receipt of the change recommendation of the feedback signal. For example, as similarly described in step 606 of flowchart 600 above, a second query, subsequent to execution of the first of step 602 of flowchart 600 and/or receipt of the change recommendation of the feedback signal, may be received for execution by a query host, e.g., computing device 218 via query manager 228 of system 200. Queries may be received over network 112 via network interface 224 from a UI, e.g., UI 226, that is provided to client device(s) 114 over network 112, or that is operating locally at the query host.

As described herein, change recommendations for query parameters of a given query may be stored in query store 236 and also later applied to optimize the execution of the same query as well as similar queries. That is, optimizations and improvements in system efficiencies for executing queries of a single query can be leveraged for numbers of other similar, but not identical queries, thus further increasing the optimizations and improvements in system efficiencies with minimal additional overhead. For instance, accurate cardinality estimations associated with query execution allow for proper allocation of system memory and processing resources, and this prevents under-allocation of resources (query executions take much longer to run), as well as over-allocation of resources (fewer queries can be executed at a time). Additionally, accurate cardinality estimations associated with query execution allow for more accurate and efficient modeling that reduces the amount of processing and memory resources required to execute a given query. As an example, different join types, indexing, and/or containment types, may be selected when accurate cardinality estimations are determined, which in turn reduces processing and memory resource usage and also leads to proper resource allocation.

As an example and as noted herein, such minimal additional overhead may be a monitor of monitors 234 of query manager 228 that is configured to observe incoming queries to computing device 218 and query manager 228 to determine if a prior executed query for which a change recommendation was generated or other queries similar to the prior executed query are received for reapplication of the change recommendation.

In step 704, the second query is determined as being similar to the first query. For instance, a monitor of monitors 234 may perform step 704. A later query may be determined as being the same as a prior query if the queries match, which may be determined by monitors 234. Likewise, monitors 234 are configured to determine similar queries based on having the same table of data queried, the same order of two or more tables, a common or same join predicate, a common or same search predicate, one or more of the same outputs, etc. Query entry may be monitored by monitors 234 as queries are entered, while in some embodiments, queries may be received by query manager 228 prior to determining if the received queries are the same as, or are similar to, a prior query. In the latter scenario, a similarity determination may be made prior to initializing execution of the queries in order to implement, or provide to the user or selection, one or more appropriate change recommendations.

In step 706, the change recommendation is provided via a user interface as a selectable option for application to the second query. For example, a change recommendation may be provided as a selectable option for execution of the second query via UI 226. Further details regarding change recommendations and query hints with respect to UIs are provided below with respect to FIG. 8.

In step 708, query execution is altered using the change recommendation based on data correlation that includes one or more of independent correlation, partial correlation, or full correlation. For instance, as noted herein, change recommendations provided in feedback signals may be based on cardinality of queried data from prior queries that are the same, or are similar, to a subsequent query received for execution. In embodiments, such change recommendations provide for query execution plan changes that account for data correlation assumptions related to estimated cardinality for specific types of query parameters or operators. When the estimated cardinality is incorrect, change recommendations may be provided related to data correlation.

Figure 8:
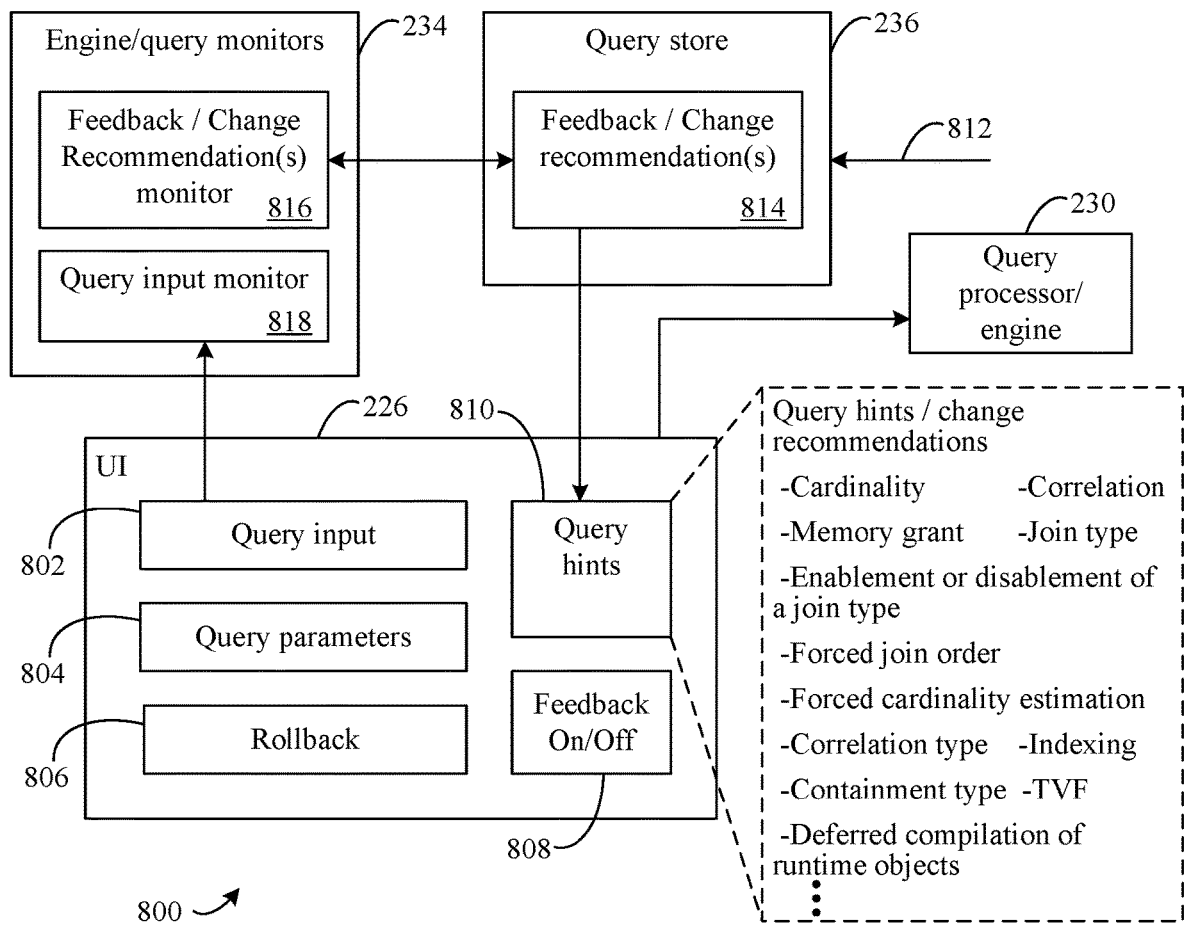
FIG. 8 shows a block diagram of a system with a user interface for utilizing cardinality estimation feedback loops in query processing, in accordance with an example embodiment.

Referring also now to FIG. 8, a block diagram of a system 800 with a user interface (UI) for utilizing cardinality estimation feedback loops in query processing is shown, according to an example embodiment. System 800 of FIG. 8 may be an embodiment of system 200 in FIG. 2 and shows UI 226 of system 200, along with query processor 230, monitors 234, and query store 236. System 800 is described with respect to flowchart 700 of FIG. 7. Further structural and operational examples will be apparent to persons skilled in the relevant art(s) based on the following descriptions.

It should be noted that a representation of UI 226 may be provided to a client device, e.g., client device(s) 114, for display to a user as noted herein, where data and selections made by the user via UI 226 are communicated to query manager 228 of system 200.

As illustrated for system 800, UI 226 includes various fields for display and/or selection of query processing information. For instance, a field 802 for query input, a field 804 for query parameters, a field 806 for rollback of changes based on change recommendations, and a field 808 for enabling/disabling feedback processing are provided. Additionally, a field 810 for the display and/or selection of one or more change recommendations, as described herein, is also shown.

It should also be noted that the fields illustrated for UI 226 in system 800 are exemplary and non-limiting in nature and are for illustrative purposes. Fewer or additional fields are contemplated herein according to embodiments, and the illustrated fields may be combined, implemented, and/or arranged in any way for UI 226, as would be understood by persons of skill in the relevant art(s) having the benefit of this disclosure.

As described above, a change recommendation may be provided via a feedback signal, e.g., signal 812, from feedback manager 214 of system 200. Received change recommendations may be stored by a query host, e.g., computing device 218, in query store 236 as a feedback/change recommendation(s) 814. Change recommendations may be associated and/or indexed based on the queries with which they are associated, which may be tracked by monitors 234 and/or query store 236 (or the like). In embodiments, a query identifier (ID) may be persisted with different aspects of query execution, query signal generation, CE feedback processing, information persistence, etc.

Monitors 234 may include a feedback/change recommendation monitor (change monitor) 816 configured to monitor query store 236 for the receipt of new change recommendations stored as feedback/change recommendation(s) 814. Monitors 234 may also include a query input monitor 818 configured to monitor query inputs of field 802, and/or to monitor received queries, for determinations of receiving the same, or similar, queries as prior executed queries.

Regarding UI 226, a user may enter a query input via field 802 and set specific query parameters via field 804. When query input monitor 818 determines that an incoming query is received, the incoming query may be referenced by change monitor 816 or input monitor 818 against indexed queries for which feedback/change recommendations 814 are stored the same or similar to a prior query for which a feedback/change recommendation(s) 814 was previously provided. An identification of a same or similar query may thus cause query store 236 to provided appropriate ones of feedback/change recommendation(s) 814 as query hints for display by field 810 of UI 226. A user may then select one or more displayed hints/change recommendations for implementation in the execution of the incoming query by query processor 230. Accordingly, the query plan for the incoming query may be altered by query processor 230 based on received change recommendations to account for cardinality of queried data, as disclosed herein.

In some scenarios, such as but not limited to oscillation or significant variability of cardinality estimations, a user may select field 806 to rollback change recommendations previously integrated for a query which may be denoted as "implemented" or the like in field 810. That is, query store 236 (and/or another component such as monitors 234) may track and/or store change recommendations implemented for queries so that if the alterations to execution of the query do not improve query processing performance, query execution may revert to a known query plan/model. In some embodiments, rollback may be performed automatically by query processor 230 based on received change recommendations. It is contemplated herein that in some cases user-mandated changes may not be rolled back automatically by the system, but instead would require a change by the user. It is also contemplated that change recommendations recently implemented may be marked as "provisional" changes that are available for rollback until such a time that these change recommendations may be labeled as "stable."

Similarly, field 808 provides an option for a user to disable or enable feedback processing. In embodiments, disabling or enabling feedback may be temporary, e.g., for execution of a single query, or may be held in effect until changed by the user.

Figure 9:
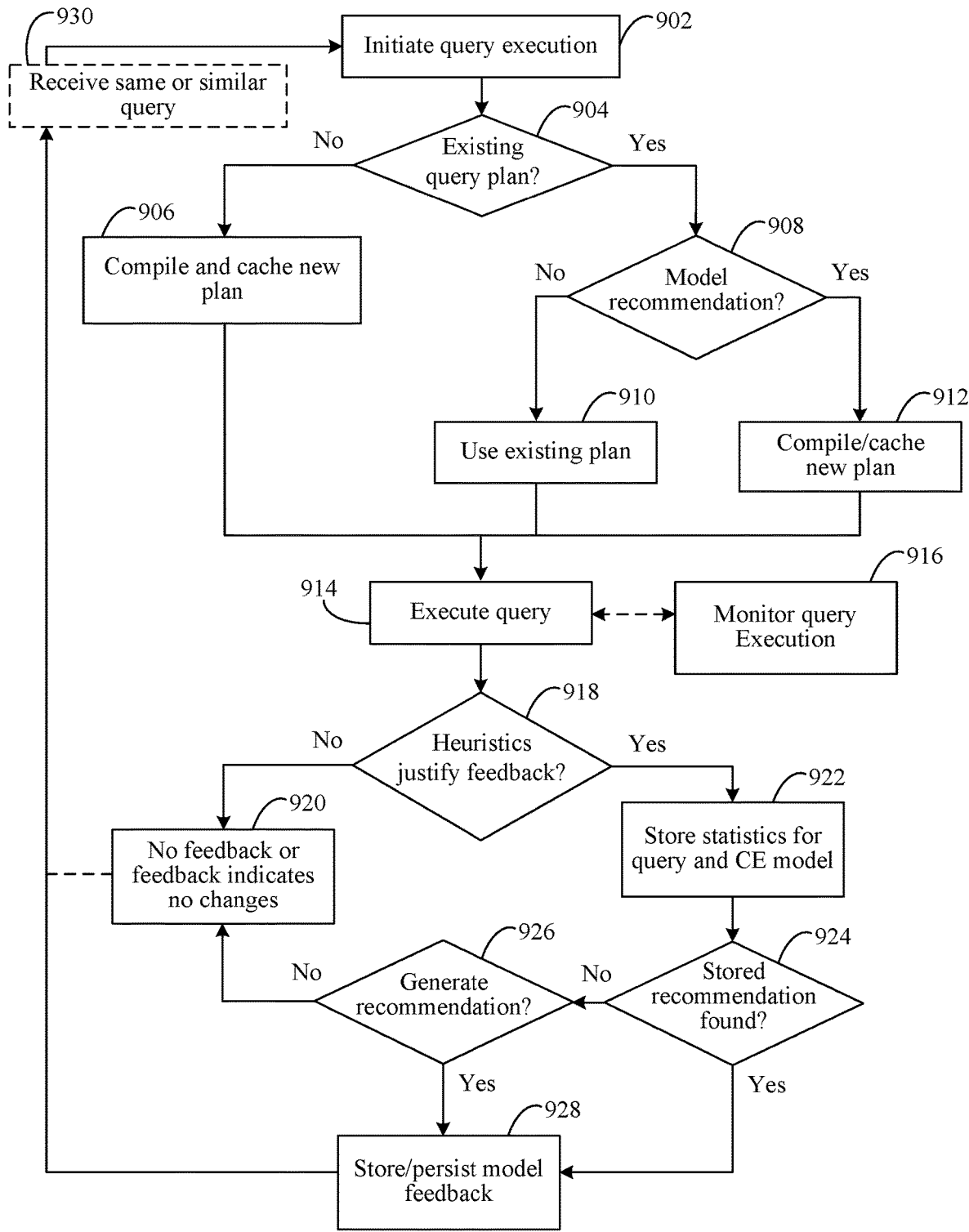
FIG. 9 shows a flow diagram for cardinality estimation feedback loops in query processing, in accordance with example embodiments.

FIG. 9 shows a flow diagram 900 for cardinality estimation feedback loops in query processing, in accordance with an example embodiment. Scrubbing manager 216 may operate according to flow diagram 900 in embodiments. System 100 of FIG. 100 and system 200 of FIG. 2 may operate according to flow diagram 900 which may provide additional details and embodiments of the flowcharts and flow diagrams described above. Further structural and operational examples will be apparent to persons skilled in the relevant art(s) based on the following descriptions. Flow diagram 900 is described as follows and begins with step 902.

In step 902, a received query is initiated for execution. In embodiments, queries may be received via UI 226 and query execution initiated to begin processing by query processor 230. Query processor 230 may be configured to determine if an existing query plan for the received query is stored for reuse at step 904. If not, a new query plan having an estimated cardinality, based on a CE model, is compiled and/or stored by query processor 230 at step 906.

If an existing query plan is stored at step 904, in step 908, it is determined if a CE model recommendation is stored for determining a cardinality estimate. For example, a feedback signal having a change recommendation may be received and the change recommendation stored as feedback/change recommendation(s) 814 in query store 236, as shown in FIG. 8 and described herein. If a CE model change is not recommended and/or available, the existing query plan determined in step 904 may be used for query execution. If a CE model change is recommended and/or available, a new query plan having an estimated cardinality, based on a changed CE model, is compiled and/or stored by query processor 230 at step 912.

From any of step 906, step 910, or step 912, flow diagram 900 may continue to step 914 where, after the initialization described above, the query is executed by query processor 914. During query execution at step 914, the query execution may be monitored by one or more of monitors 234 in step 916 for generation of runtime statistics by query signal generator 232. An event signal with the runtime statistics may be sent to feedback optimizer 208 where, at step 918, feedback optimizer 208 heuristically determines if feedback should be provided in the form of change recommendations, as described herein. If not feedback is needed or determined, flow diagram 900 may proceed to step 920 where an indication of no change recommendations is provided to the query host, or alternatively, no action is taken (while flow diagram 900 may return to step 902).

If heuristics and analysis by query plan signal analyzer 212 and/or feedback manager 214 justify feedback generation, at step 922 statistics for the query and the CE model used may be stored by query plan signal analyzer 212 and/or feedback manager 214 in an intermediate storage, e.g., as query information 116 in data store 106, or as query information 216. From step 922, a feedback manager 214 may determine if a stored change recommendation for the feedback is present in query information 116 in data store 106, or in query information 216. If not, flow diagram 900 continues to step 926 where feedback manager 214 determines if a change recommendation(s) will be, or can be, generated. If not, the flow proceeds to step 920 described above, but if a change recommendation(s) will be generated at step 926, feedback manager 214 performs the generation and in step 928 the feedback/change recommendation(s) is stored in the intermediate storage and/or is provided to the query host for storage in query store 236.

From either of step 920 or step 928, flow diagram may continue back to step 902 to further iterate on cardinality estimation feedback loops to optimize query processing as described herein. Flow diagram 900 may also monitor for received queries that are the same or similar to prior queries at step 930, as described herein.

III. Example Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including without limitation system 100 of FIG. 1, system 200 of FIG. 2, system 500 of FIG. 5, and system 800 of FIG. 8, along with any components and/or subcomponents thereof, as well as any flowcharts/flow diagrams described herein, including portions thereof, and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of mobile systems and computing devices provided herein are provided for purposes of illustration, and are not intended to be limiting. Embodiments may be implemented in further types of computer systems, as would be known to persons skilled in the relevant art(s).

Figure 10:
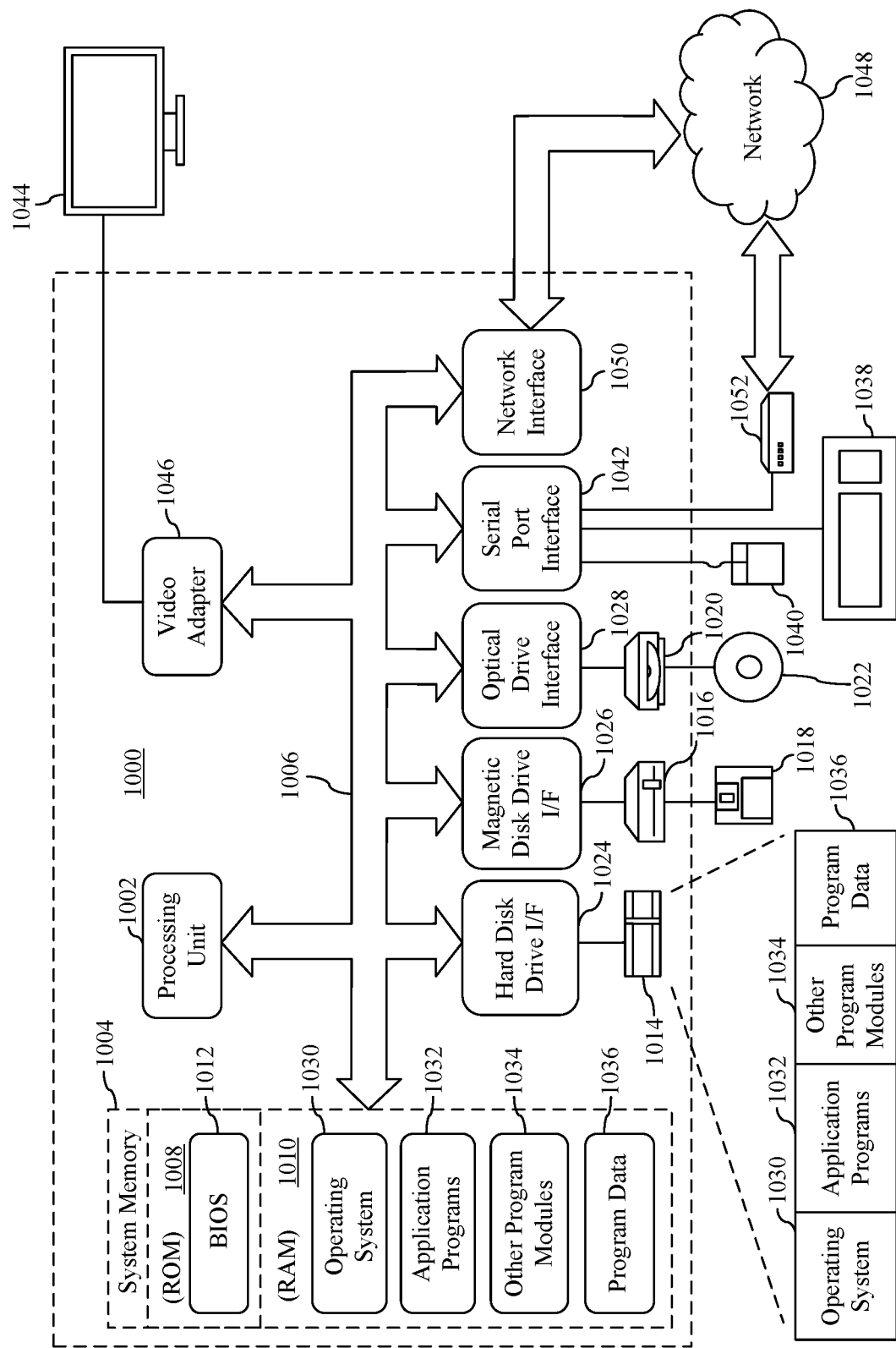
FIG. 10 shows a block diagram of an example computing device that may be used to implement embodiments.

FIG. 10 depicts an exemplary implementation of a computing device 1000 in which embodiments may be implemented. For example, embodiments described herein may be implemented in one or more computing devices similar to computing device 1000 in stationary or mobile computer embodiments, including one or more features of computing device 1000 and/or alternative features. The description of computing device 1000 provided herein is provided for purposes of illustration, and is not intended to be limiting. Embodiments may be implemented in further types of computer systems and/or game consoles, etc., as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing embodiments described herein, such as but not limited to, system 100 of FIG. 1, system 200 of FIG. 2, system 500 of FIG. 5, and system 800 of FIG. 8, along with any components and/or subcomponents thereof, as well as the flowcharts/flow diagrams described herein, including portions thereof, and/or further examples described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," "computer-readable storage medium," and "computer-readable storage device," etc., are used to refer to physical hardware media. Examples of such physical hardware media include the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media (including memory 1020 of FIG. 10). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Example and Advantages

As described, systems and devices embodying the techniques herein may be configured and enabled in various ways to perform their respective functions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

The described embodiments herein provide for increased memory and processor usage efficiency through cardinality estimation feedback that optimizes query plans and CE models. UIs are also improved by allowing the presentation and selection of change recommendations based on cardinality for altering query plans and/or CE models for query parameters, a feature previously not available for query execution.

Moreover, the described embodiments do not exist in software implementations for cardinality estimation feedback loops in query processing. Conventional solutions merely base cardinality estimations on specific queries based on data distributions and query shapes, but lack the ability to implement runtime statistics analysis and associate feedback to optimize query plans based on cardinality of queried data, which is a major cost factor in query processing for relational databases.

It is also contemplated herein that CE feedback may be aggregated over complete workloads comprising more than one individual query.

Additionally, the embodiments herein do not significantly increase system load and/or overhead with respect to query execution by query hosts. Thus, poorly planned and/or modeled queries with slow or long runtimes are not further degraded in their performance by monitoring and signal generation (which allow for rapid release of utilized system resources), but are optimized in subsequent executions.

Accordingly, reactive use of cardinality estimation feedback from current executions of queries to determine appropriate model choices for a current query to be applied in subsequent executions of that (or a similar) query is enabled—and proactive use of cardinality estimation model analysis to drive query processing decisions of future queries that are semantically similar is also provided.

The additional examples and embodiments described in this Section may be applicable to examples disclosed in any other Section or subsection of this disclosure.

Embodiments in this description provide for systems, devices, and methods for cardinality estimation feedback loops in query processing. For instance, a system is described herein. The system may be configured and enabled in various ways for such cardinality estimation feedback loops, as described herein. The system includes a processing system that includes one or more processors, and a memory configured to store program code to be executed by the processing system. The program code includes a signal router, a query plan signal analyzer, and a feedback manager. The signal router is configured to receive event signals from a query host that executes a query against a database according to a query plan generated by the query host, the event signals comprising runtime statistics of the query, and provide selected ones of the event signals to the query plan signal analyzer. The query plan signal analyzer is configured to determine via analysis of the runtime statistics an actual cardinality of data queried in the database and at least one query parameter of a model for the query that is associated with an estimated cardinality utilized for the model. The feedback manager is configured to determine a change recommendation for the at least one query parameter based at least on a difference between the estimated cardinality and the actual cardinality, and provide indicia of the change recommendation in a feedback signal to the query host.

In an embodiment of the system, the feedback manager is configured to store information in a data storage system, the information comprising one or more of the query, the at least one query parameter, the actual cardinality, the estimated cardinality, the runtime statistics, the event signals, or the change recommendation, and retrieve the information to determine a subsequent change recommendation.

In an embodiment of the system, the feedback manager is configured to determine the change recommendation also based at least on a prior query parameter of a prior query executed before the query.

In an embodiment of the system, the feedback manager is configured to determine the change recommendation also based at least on a correlation of queried data that includes one or more of independent correlation, partial correlation, or full correlation.

In an embodiment of the system, the change recommendation includes information to alter a subsequent execution of the query and one or more similar queries, and, with respect to the query, the one or more similar queries include at least one of a same table, a same order of two or more tables, a same join predicate, a same search predicate, or one or more same outputs.

In an embodiment of the system, the change recommendation for the at least one query parameter comprises a rollback to a prior model for the query or a temporary disabling of feedback signals.

In an embodiment of the system, the at least one query parameter comprises one or more of a memory grant, a join type, an indexing setting, enablement or disablement of a join type, a forced join order, a forced cardinality estimation, a correlation type, a containment type, an interleaved optimization for a table-valued function, or a deferred compilation of runtime objects such as table variables.

In an embodiment of the system, the query plan signal analyzer is configured to determine state information comprising state information of a query statement before and after a change to the at least one query parameter, or state information for temporary disabling of feedback signals due to oscillation of cardinality estimations. In the embodiment, the feedback manager is configured to determine the change recommendation based at least on the determined state information.

A computer-implemented method is also described herein. The computer-implemented method may be for cardinality estimation feedback loops in query processing, as described herein. The computer-implemented method includes receiving at least one event signal from a query host that executes a query against a database according to a query plan generated by the query host, the at least one event signal comprising one or more runtime statistics of the query, and determining via analysis of the one or more runtime statistics an actual cardinality of data queried in the database and at least one query parameter of a model for the query that is associated with an estimated cardinality utilized for the model. The computer-implemented method also includes generating a change recommendation for the at least one query parameter based at least on a difference between the estimated cardinality and the actual cardinality, the change recommendation being configured to alter a subsequent execution of the query and one or more similar queries, and providing the change recommendation in a feedback signal to the query host.

In an embodiment of the computer-implemented method, the change recommendation is generated also based at least on a prior query parameter of a prior query executed before the query.

In an embodiment of the computer-implemented method, the change recommendation is generated also based at least on a correlation of queried data that includes one or more of independent correlation, partial correlation, or full correlation.

In an embodiment of the computer-implemented method, the one or more similar queries include at least one of a same table, a same order of two or more tables, a same join predicate, a same search predicate, or one or more same outputs.

In an embodiment of the computer-implemented method, the at least one event signal includes a message that comprises state information of a query statement before and after a change to the at least one query parameter, or state information for temporary disabling of feedback signals due to oscillation of cardinality estimations.

In an embodiment of the computer-implemented method, the change recommendation for the at least one query parameter comprises a rollback to a prior model for the query or a temporary disabling of feedback signals.

In an embodiment of the computer-implemented method, the at least one query parameter comprises one or more of a memory grant, a join type, enablement or disablement of a join type, a forced join order, a forced cardinality estimation, a correlation type, an indexing setting, a containment type, an interleaved optimization for a table-valued function, or a deferred compilation of runtime objects such as table variables.

A computer-readable storage medium having program instructions recorded thereon that, when executed by at least one processing device, configure the at least one processing device to perform cardinality estimation feedback loops in query processing, is also described. The at least one processing device is configured to generate at least one event signal that is provided to an optimization host for a first query executing against a database according to a first query plan and a first estimated cardinality, the at least one event signal comprising runtime statistics of the first query, and receive a feedback signal, from the optimization host, having a change recommendation for at least one query parameter of the first query. The at least one processing device is also configured to determine a second query plan for a second query received subsequent to said receiving the feedback signal, the second query plan incorporating the change recommendation and based on a second estimated cardinality, execute the second query according to the second query plan, and generate at least one other event signal that comprises runtime statistics of the second query, and that is provided to the optimization host for the second query.

In an embodiment of the computer-readable storage medium, the program instructions configure the at least one processing device to determine that the second query is similar to the first query, and provide the change recommendation via a user interface as a selectable option for application to the second query.

In an embodiment of the computer-readable storage medium, the second query is similar to the first query based on one or more of a same table, a same order of two or more tables, a same join predicate, a same search predicate, or one or more same outputs.

In an embodiment of the computer-readable storage medium, to generate the at least one event signal or generate the at least one other event signal, the program instructions configure the at least one processing device to track state information of query statements before and after a change to query parameters, or track state information for temporary disabling of feedback signals due to oscillation of cardinality estimations.

In an embodiment of the computer-readable storage medium, the change recommendation alters query execution based on data correlation that includes one or more of independent correlation, partial correlation, or full correlation.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:
1. A system comprising:
a processing system that includes one or more processors; and
a memory configured to store program code to be executed by the processing system, the program code comprising:
a signal router, a query plan analyzer, and a feedback manager;

the signal router configured to:
  receive event signals from a query host that executes a query against a database according to a query plan generated by the query host, the event signals comprising runtime statistics of the query; and
  provide selected ones of the event signals to the query plan signal analyzer;
the query plan signal analyzer configured to:
  determine via analysis of the runtime statistics an actual cardinality of data queried in the database and at least one query parameter of a model for the query that is associated with an estimated cardinality utilized for the model; and
  determine state information for temporary disabling of feedback signals due to a detected oscillation of cardinality estimations; and
the feedback manager configured to:
  determine a change recommendation for the at least one query parameter based at least on a difference between the estimated cardinality and the actual cardinality, and at least on the state information; and
  provide indicia of the change recommendation in a feedback signal to the query host.

2. The system of claim 1, wherein the feedback manager is configured to:
  store information in a data storage system, the information comprising one or more of the query, the at least one query parameter, the actual cardinality, the estimated cardinality, the runtime statistics, the event signals, or the change recommendation; and
  retrieve the information to determine a subsequent change recommendation.

3. The system of claim 2, wherein the feedback manager is configured to determine the change recommendation also based at least on a prior query parameter of a prior query executed before the query.

4. The system of claim 1, wherein the feedback manager is configured to determine the change recommendation also based at least on a correlation of queried data that includes one or more of independent correlation, partial correlation, or full correlation.

5. The system of claim 1, wherein the change recommendation includes information to alter a subsequent execution of the query and one or more similar queries; and
  wherein, with respect to the query, the one or more similar queries include at least one of:
    a same table;
    a same order of two or more tables;
    a same join predicate;
    a same search predicate; or
    one or more same outputs.

6. The system of claim 1, wherein the change recommendation for the at least one query parameter comprises a rollback to a prior model for the query or a temporary disabling of feedback signals.

7. The system of claim 1, wherein the at least one query parameter comprises one or more of a memory grant, a join type, enablement or disablement of a join type, a forced join order, a forced cardinality estimation, a correlation type, an indexing setting, a containment type, an interleaved optimization for a table-valued function, or a deferred compilation of runtime objects.

8. The system of claim 1, wherein the query plan signal analyzer is also configured to determine the state information comprising:
  state information of a query statement before and after a change to the at least one query parameter.

9. A computer-implemented method, comprising:
  receiving by a signal router event signals from a query host that executes a query against a database according to a query plan generated by the query host, the event signals comprising runtime statistics of the query; and
  providing by the signal router selected ones of the event signals to a query plan signal analyzer;
  determining by the query plan signal analyzer via analysis of the runtime statistics an actual cardinality of data queried in the database and at least one query parameter of a model for the query that is associated with an estimated cardinality utilized for the model;
  determining by the query plan signal analyzer state information for temporary disabling of feedback signals due to a detected oscillation of cardinality estimations;
  determining by a feedback manager a change recommendation for the at least one query parameter based at least on a difference between the estimated cardinality and the actual cardinality, and at least on the state information; and
  providing by the feedback manager indicia of the change recommendation in a feedback signal to the query host.

10. The computer-implemented method of claim 9, further comprising:
  storing by the feedback manager information in a data storage system, the information comprising one or more of the query, the at least one query parameter, the actual cardinality, the estimated cardinality, the runtime statistics, the event signals, or the change recommendation; and
  retrieving by the feedback manager the information to determine a subsequent change recommendation.

11. The computer-implemented method of claim 10, further comprising:
  determining by the feedback manager the change recommendation also based at least on a prior query parameter of a prior query executed before the query.

12. The computer-implemented method of claim 9, further comprising:
  determining the feedback manager the change recommendation also based at least on a correlation of queried data that includes one or more of independent correlation, partial correlation, or full correlation.

13. The computer-implemented method of claim 9, wherein the change recommendation includes information to alter a subsequent execution of the query and one or more similar queries; and
  wherein, with respect to the query, the one or more similar queries include at least one of:
    a same table;
    a same order of two or more tables;
    a same join predicate;
    a same search predicate; or
    one or more same outputs.

14. The computer-implemented method of claim 9, wherein the at least one query parameter comprises one or more of a memory grant, a join type, enablement or disablement of a join type, a forced join order, a forced cardinality estimation, a correlation type, an indexing setting, a containment type, an interleaved optimization for a table-valued function, or a deferred compilation of runtime objects.

15. The computer-implemented method of claim 9, wherein said determining by the query plan signal analyzer the state information also includes determining state information of a query statement before and after a change to the at least one query parameter.

16. A computer-readable storage medium having program instructions recorded thereon that, when executed by at least one processing device, configure the at least one processing device to perform a method, the method comprising:
    receiving by a signal router event signals from a query host that executes a query against a database according to a query plan generated by the query host, the event signals comprising runtime statistics of the query; and
    providing by the signal router selected ones of the event signals to a query plan signal analyzer;
    determining by the query plan signal analyzer via analysis of the runtime statistics an actual cardinality of data queried in the database and at least one query parameter of a model for the query that is associated with an estimated cardinality utilized for the model;
    determining by the query plan signal analyzer state information for temporary disabling of feedback signals due to a detected oscillation of cardinality estimations;
    determining by a feedback manager a change recommendation for the at least one query parameter based at least on a difference between the estimated cardinality and the actual cardinality, and at least on the state information; and
    providing by the feedback manager indicia of the change recommendation in a feedback signal to the query host.

17. The computer-readable storage medium of claim 16, wherein the method further comprises:
    storing by the feedback manager information in a data storage system, the information comprising one or more of the query, the at least one query parameter, the actual cardinality, the estimated cardinality, the runtime statistics, the event signals, or the change recommendation; and
    retrieving by the feedback manager the information to determine a subsequent change recommendation.

18. The computer-readable storage medium of claim 17, wherein the method further comprises:
    determining by the feedback manager the change recommendation also based at least on a prior query parameter of a prior query executed before the query; or
    determining the feedback manager the change recommendation also based at least on a correlation of queried data that includes one or more of independent correlation, partial correlation, or full correlation.

19. The computer-readable storage medium of claim 16, wherein the change recommendation includes information to alter a subsequent execution of the query and one or more similar queries; and
    wherein, with respect to the query, the one or more similar queries include at least one of:
    a same table;
    a same order of two or more tables;
    a same join predicate;
    a same search predicate; or
    one or more same outputs.

20. The computer-readable storage medium of claim 16, wherein the at least one query parameter comprises one or more of a memory grant, a join type, enablement or disablement of a join type, a forced join order, a forced cardinality estimation, a correlation type, an indexing setting, a containment type, an interleaved optimization for a table-valued function, or a deferred compilation of runtime objects.

* * * * *